(12) United States Patent
Hung et al.

(10) Patent No.: US 10,976,338 B2
(45) Date of Patent: Apr. 13, 2021

(54) APPARATUS AND METHOD FOR SENSING ACCELERATION OR FORCE USING FIBER BRAGG GRATING (FBG)

(71) Applicant: Optilab, LLC, Phoenix, AZ (US)

(72) Inventors: Henry Hung, Phoenix, AZ (US);
Leijun Yin, Phoenix, AZ (US);
Andrew Agrusa, Phoenix, AZ (US);
Jeremy Hadsell, Phoenix, AZ (US);
Andre Brewer, Phoenix, AZ (US)

(73) Assignee: Optilab, LLC, Phoenix, AZ (US)

( * ) Notice: Subject to any disclaimer, the term of this patent is extended or adjusted under 35 U.S.C. 154(b) by 48 days.

(21) Appl. No.: 16/128,292

(22) Filed: Sep. 11, 2018

(65) Prior Publication Data

US 2019/0079111 A1 Mar. 14, 2019

Related U.S. Application Data

(60) Provisional application No. 62/557,078, filed on Sep. 11, 2017.

(51) Int. Cl.
*G01P 15/093* (2006.01)
*G01P 15/08* (2006.01)
*G01L 1/24* (2006.01)

(52) U.S. Cl.
CPC ............ *G01P 15/093* (2013.01); *G01L 1/246* (2013.01); *G01P 15/0802* (2013.01)

(58) Field of Classification Search
CPC .... G01L 1/246; G01P 15/093; G01P 15/0135; G01P 15/0802; G01B 11/18; G01D 5/268; G01D 5/35316

USPC ....................................................... 73/514.26
See application file for complete search history.

(56) References Cited

U.S. PATENT DOCUMENTS

| | | | | |
|---|---|---|---|---|
| 4,322,829 A * | 3/1982 | Davis, Jr. | ............... | G01V 1/181 73/653 |
| 4,739,661 A * | 4/1988 | Bucholtz | ............... | G01P 15/093 73/514.26 |
| 4,800,267 A * | 1/1989 | Freal | ................ | G01P 15/093 250/227.16 |
| 4,932,263 A * | 6/1990 | Wlodarczyk | ......... | G01L 9/0076 73/705 |
| 5,276,322 A * | 1/1994 | Carome | ................ | G01P 15/093 73/514.26 |
| 5,291,014 A * | 3/1994 | Brede | .................... | B60R 21/01 250/227.21 |
| 6,363,786 B1 * | 4/2002 | Fersht | ................... | G01P 15/093 73/514.26 |
| 6,496,264 B1 * | 12/2002 | Goldner | ................ | G01H 9/004 356/478 |
| 6,563,967 B2 * | 5/2003 | Tweedy | ................ | G01B 11/16 250/227.19 |

(Continued)

*Primary Examiner* — Tran M. Tran
(74) *Attorney, Agent, or Firm* — Loza & Loza, LLP; George L. Fountain

(57) ABSTRACT

A fiber-based accelerometer (FAC) detector includes a base; first and second flexures mechanically coupled to the base; first and second masses mechanically coupled to the first and second flexures, respectively; and a fiber Bragg grating (FBG) fiber mechanically coupled to the first and second masses, wherein the first and second flexures and the first and second masses are configured to move in response to a force and/or acceleration acting upon the first and second masses to produce a compression or expansion of the first FBG fiber.

19 Claims, 6 Drawing Sheets

(56) References Cited

U.S. PATENT DOCUMENTS

| | | | | |
|---|---|---|---|---|
| 6,921,894 B2 * | 7/2005 | Swierkowski | G01P 15/093 | 250/227.21 |
| 6,955,085 B2 * | 10/2005 | Jones | G01H 9/004 | 73/514.26 |
| 6,998,599 B2 * | 2/2006 | Lagakos | G01L 9/0077 | 250/227.16 |
| 7,047,816 B2 * | 5/2006 | Jones | G01L 9/0039 | 73/729.1 |
| 7,137,299 B2 * | 11/2006 | Meyer | G01H 9/00 | 73/514.27 |
| 7,323,678 B2 * | 1/2008 | Abrate | G01D 5/268 | 250/227.14 |
| 7,503,215 B2 * | 3/2009 | Berg | G01V 1/181 | 73/514.26 |
| 7,702,190 B2 * | 4/2010 | Hao | G01D 5/35383 | 385/10 |
| 7,714,271 B1 * | 5/2010 | Levine | G01H 9/004 | 250/227.14 |
| 8,009,946 B2 * | 8/2011 | Xia | A61B 5/0059 | 385/13 |
| 8,379,225 B2 * | 2/2013 | Koste | G01L 1/246 | 73/660 |
| 8,514,409 B2 * | 8/2013 | Koste | G01B 11/18 | 356/614 |
| 8,726,732 B2 * | 5/2014 | Littler | G01H 9/004 | 73/514.26 |
| 8,743,372 B2 * | 6/2014 | Fourguette | G01V 1/18 | 356/480 |
| 9,201,089 B2 * | 12/2015 | Andresen | G01H 9/004 | |
| 9,726,538 B2 | 8/2017 | Hung | | |
| 9,778,042 B2 * | 10/2017 | Bramhavar | G01C 19/722 | |
| 9,983,225 B2 * | 5/2018 | Fertig | H01S 5/0014 | |
| 10,069,494 B2 * | 9/2018 | Schmidt | G01K 11/32 | |
| 10,330,697 B2 * | 6/2019 | Fertig | G01P 21/00 | |
| 10,451,449 B2 * | 10/2019 | Knoppers | G01L 5/0057 | |
| 10,551,255 B2 * | 2/2020 | Matthijssen | G01D 5/35316 | |
| 2017/0059606 A1 * | 3/2017 | Herbst | G01P 15/093 | |

* cited by examiner

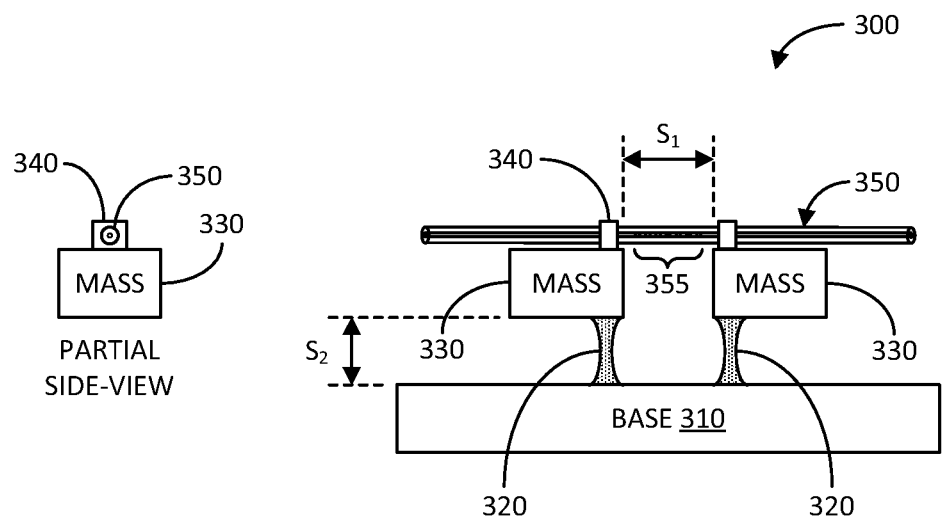
FIG. 3
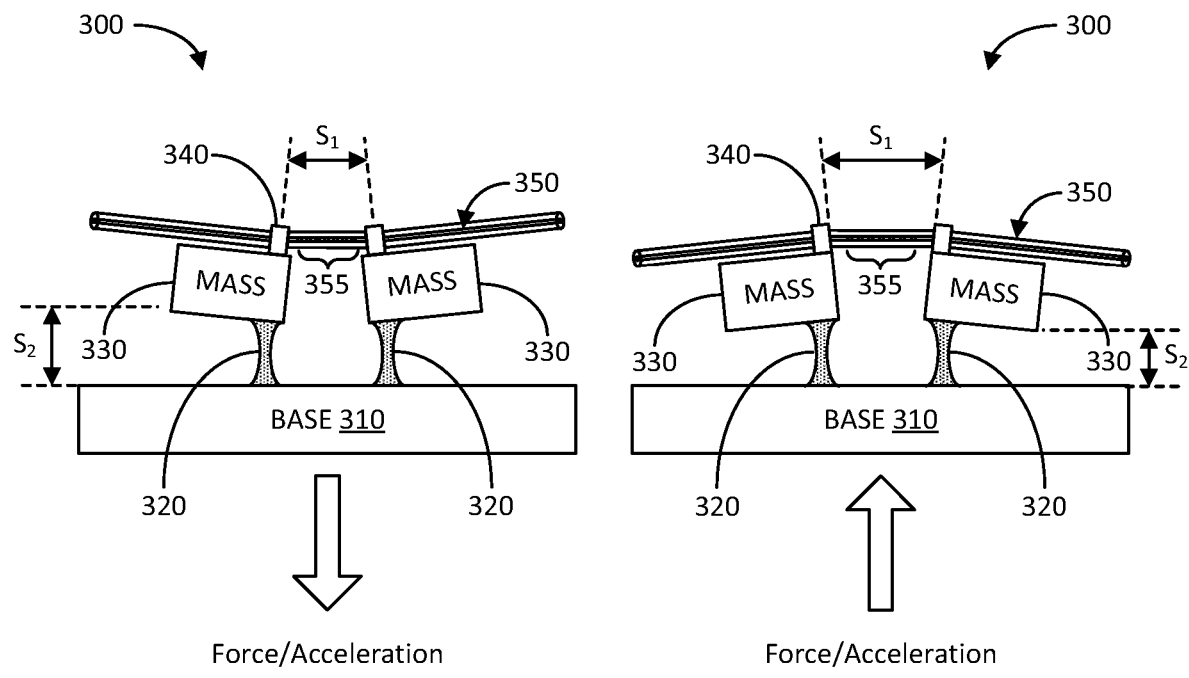
Force/Acceleration
FIG. 4A
Force/Acceleration
FIG. 4B

APPARATUS AND METHOD FOR SENSING ACCELERATION OR FORCE USING FIBER BRAGG GRATING (FBG)

CROSS-REFERENCE TO RELATED APPLICATION

This application claims the benefit of the filing date of Provisional Application Ser. No. 62/557,078, filed on Sep. 11, 2017, which is incorporated herein by reference.

BACKGROUND

Field

Aspects of the present disclosure relate generally to accelerometers, and in particular, to an apparatus and method for sensing acceleration or force using fiber Bragg grating (FBG).

Background

In many applications, there is a need to sense and/or measure force and/or acceleration acting upon a device-of-interest. A device typically used to sense and/or measure force and/or acceleration is called an accelerometer. Accelerometers may be used in land vehicle application to trigger deployment of an airbag when the sensed or measured acceleration is above a certain threshold. In more sophisticated systems, accelerometers may be used in driver-assisted applications to maintain a vehicle within safe distance from surrounding vehicles and objects. In aviation applications, accelerometers may be used for navigation purposes, such as those used in an inertial reference systems. Moreover, as force is equal to mass multiplied by accelerations, accelerometers may be used to measure force acting upon a device-of-interest.

Accordingly, this disclosure relates to improvements in accelerometers used for sensing and/or measuring force and/or acceleration.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

An aspect of the disclosure relates to an apparatus a base; first and second flexures mechanically coupled to the base; first and second masses mechanically coupled to the first and second flexures, respectively; and a fiber Bragg grating (FBG) fiber mechanically coupled to the first and second masses, wherein the first and second flexures and the first and second masses are configured to move in response to a force and/or acceleration acting upon the first and second masses to produce a compression or expansion of the FBG fiber.

To the accomplishment of the foregoing and related ends, the one or more embodiments include the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the description embodiments are intended to include all such aspects and their equivalents.

BRIEF DESCRIPTION OF THE DRAWINGS

FIG. 3 illustrates a side view of an exemplary fiber-based acceleration (FAC) detector in accordance with another aspect of the disclosure.

FIGS. 4A-4B illustrate side views of the exemplary FAC detector of FIG. 3 when sensing acceleration or force that produces compression and expansion of the FBG in accordance with another aspect of the disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Acceleration is an important parameter that is measured in many industries and venues. Acceleration is directly related to force, which is another parameter of interest for many industries and venues. Some acceleration detectors are used for constant acceleration, large-radius circular acceleration or slowly changing acceleration. These can have slower responding components.

If rapid changes in acceleration are needed to be measured, then faster responding components are necessary. Usually, the sensitivity of such detectors is dependent on the magnitude of acceleration that will be measured. For instance, a device that will measure acceleration of a rocket will most likely not be sensitive to small variations, and may not even be able to measure the acceleration felt by a car. Likewise, the detectors used to measure small accelerations felt by a swaying building would not be able to sense the acceleration of a rocket, or may even be damaged under such extreme conditions.

Additionally, vibrational detectors must be very sensitive to rapid changes in acceleration (since that is essentially what a vibration can be thought to be) which require high sensitivity. Since many vibrations can be large in amplitude, the detector would have to be able to stand large amplitudes of acceleration change. Many detectors are not suited to this work.

Presented in this disclosure is a fiber-based acceleration (FAC) detector, which is able to operate in many of the above-mentioned scenarios without modification. The conceptual design of using a fiber-based system also for high sensitivity. The mechanical form allows for a wide dynamic range. Together, the drawings presented in this disclosure allow for an acceleration detector that is highly sensitive and has a very large range, sensing both small and large accelerations. Additionally, it is well suited to vibrational detection. The specific working principle and conceptual design will be described with reference to various implementations described below.

Figure 1:
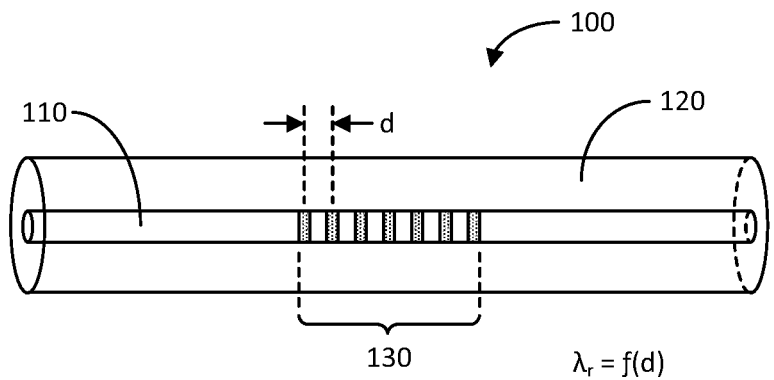
FIG. 1 illustrates a side view of an exemplary fiber Bragg Grating (FBG) fiber in accordance with an aspect of the disclosure.

FIG. 1 illustrates a side view of an exemplary fiber Bragg Grating (FBG) fiber 100 in accordance with an aspect of the disclosure. For the purposes of this disclosure, an FBG fiber is defined as any fiber (single mode (SM), polarization-maintaining (PM), doped or un-doped, various pump claddings, etc.) which contains a Fiber Bragg Grating (FBG) in a segment of the fiber. A first concept of the working principle of the FAC is the FBG 100.

The FBG fiber 100 includes a cylindrical core 110 coaxially surrounded by a cladding 120. The core 110 of the FBG fiber 100 includes at least one FBG segment 130 including a series of alternating regions 130 of differing refractive index, which is designed to be reflective to a specific wavelength or bandwidth of electromagnetic radiation in its intrinsic state (no stresses of any kind). The distance or period "d" between adjacent regions of the same refractive index determines the wavelength $\lambda_r$ of the electromagnetic radiation reflected by the FBG segment 130 (e.g., $\lambda_r=f(d)$).

Figure 2:
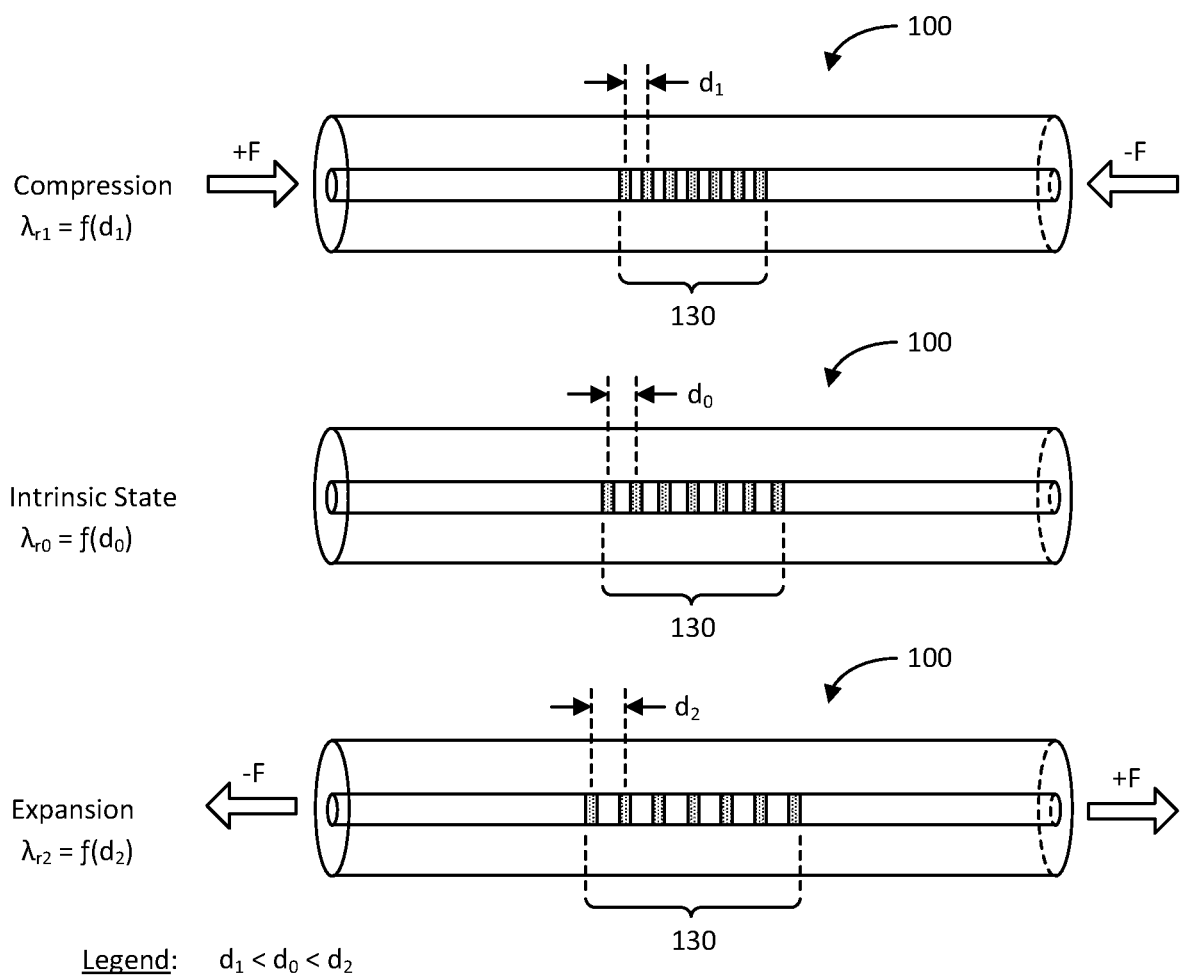
FIG. 2 illustrates side views of the exemplary fiber Bragg Grating (FBG) fiber of FIG. 1 from top-to-bottom in compressed, intrinsic, and expanded states in accordance with another aspect of the disclosure.

FIG. 2 illustrates side views of the exemplary FBG fiber 100 from top-to-bottom in compressed, intrinsic, and expanded states in accordance with another aspect of the disclosure. If the FBG fiber 100 is expanded or compressed, as shown in the upper or lower depiction of the FBG fiber 100 in FIG. 2, the spacing or periodicity $d_1$ or $d_2$ associated with the FBG segment 130 is changed; thereby changing the wavelength or bandwidth of the reflected electromagnetic radiation determined by Fresnel reflections at the refractive interfaces.

For example, when the FBG fiber 100 is compressed, the spacing or periodicity $d_1$ associated with the FBG segment 130 is less than the distance or periodicity $d_0$ of the FBG segment 130 when the FBG fiber 100 is in its intrinsic state (shown in the middle in FIG. 2). When the FBG fiber 100 is expanded, the distance or periodicity $d_2$ associated with the FBG segment 130 is greater than the distance or periodicity $d_0$ of the FBG segment 130 when the FBG fiber 100 is in its intrinsic.

Accordingly, the wavelength $\lambda_{r1}$ of an optical signal reflected off the compressed FBG fiber 100, which is a function of the distance or periodicity $d_1$ of the FBG segment 130 ($\lambda_{r1}=f(d_1)$ is less than the wavelength $\lambda_{r0}$ of an optical signal reflected off the intrinsic FBG fiber 100 (($\lambda_{r1}=f(d_1)$ <($\lambda_{r0}=f(d_0)$). Similarly, the wavelength $\lambda_{r2}$ of an optical signal reflected off the intrinsic FBG fiber 100 is less than the wavelength $\lambda_{r2}$ of an optical signal reflected off the expanded FBG fiber 100 (($\lambda_{r0}=f(d_0)$<($\lambda_{r2}=f(d_2)$).

The FAC directs force or acceleration through the device in such a way that the force acts upon the FBG fiber 100 in the way prescribed in FIG. 2. A spectrum of electromagnetic radiation is sent through the FBG fiber 100 and the force/acceleration is determined by the wavelengths that are reflected. Under no forces, the FBG fiber 100 is said to be in its intrinsic state. When the intrinsic wavelength is being reflected, it is known that there is no force acting upon the FAC. Reflecting wavelengths differing from that intrinsic wavelength are the result of forces acting upon the FAC. The exact calibration of wavelength-to-force is determined by the specific mechanical design and can be modified to desired specifications.

FIG. 3 illustrates a side view of an exemplary fiber-based acceleration (FAC) detector 300 in accordance with another aspect of the disclosure. The FAC detector 300 includes a base 310, a pair of flexures 320, a pair of masses 330, a pair of fiber/mass couplers (FMC) 340 and an FBG fiber 350 including at least one FBG segment 355.

The FBG fiber 350 is connected to the FMCs 340, as better illustrated in the partial side-view insert depicting the mass 330, FMC 340, and FBG fiber 350. As shown, the FMCs 340 are connected to masses 330, which are connected to flexures 320, which are connected to the base 310. Each FMC/mass/flexure group is spaced from the other in the center by a spacing $S_1$, which is defined as the distance between the masses 330. Each mass 330 is suspended by the flexure 320, separating it from the base 310 by a distance $S_2$. Each of the components can be made from any material that will allow the component to accomplish its specific task, as described as follows.

The FMCs 340 are connected to the masses 330 so that the FBG fiber 350 is suspended above the $S_1$ gap. The FMCs 340 can be attached to the masses 330 anywhere on the masses 330. The depiction in FIG. 3 shows them on the top for convenience.

The masses 330 lend the necessary inertial resistance to movement, which is an integral part of the FAC method of sensing acceleration or force. The masses 330 can be of any shape. The inertial resistance is defined from Newton's first law of motion: objects in motion tend to stay in motion unless acted upon by an external force and objects at rest tend to stay at rest unless acted upon by an external force, applicable in inertial reference frames.

The flexures 320 can be of any shape and configuration, but allow for the masses to move in such a way that compresses or expands the FBG fiber 350 as discussed with reference to FIG. 2. Therefore, the flexures 320, in conjunction with the masses 330 should be flexible enough so that the FBG fiber 350 is strained a noticeable amount. The "noticeable amount" is dependent on the end use and can be altered by the design of the flexures 320.

The base 310 should be rigid and both FMC/Mass/Flexure groups should be attached to the base 310. The base 310 acts as the joining piece that connects all the components hereto described together into one FAC 300. The base 310 also serves as a reference for both flexures 320 to move from and create the necessary strain on the FBG fiber 350.

FIG. 4A illustrates a side view of the exemplary FAC 300 when sensing acceleration or force that produces compression of the FBG fiber 350 in accordance with another aspect of the disclosure. When a force/acceleration is applied to the FAC 300 in such a way that the force or acceleration is in a downward direction as shown, the masses 330, due to inertial resistance cause the flexures 320 to bend or change in shape; in this case, causing $S_2$ to increase and $S_1$ to decrease, which causes the FBG fiber 350 to be compressed. In other words, due to the flexures 320 respective connection to the masses 330 in an off-center manner, the left mass 330 pivots in a clockwise manner and the right mass 330 pivots in a counter-clockwise manner in response to the downward force or acceleration. This produces a compression-type strain upon the FBG segment 355 of the FBG fiber 350.

As discussed further herein, a broadband incident light transmitted into the FBG fiber 350 causes the FBG segment 355 to reflect a portion of the broadband incident light with a wavelength being a function of the amount the FBG segment 355 has been compressed, which, in turn, is a function of the downward force or acceleration applied to the FAC 300. Thus, by detecting the wavelength of the reflected light, a measurement of the downward force or acceleration may be ascertained.

FIG. 4B illustrates a side view of the exemplary FAC 300 when sensing acceleration or force that produces expansion of the FBG fiber 350 in accordance with another aspect of the disclosure. When a force/acceleration is applied to the FAC 300 in such a way that the force or acceleration is in an upward direction as shown, the masses 330, due to inertial resistance cause the flexures 320 to bend or change in shape, in this case, causing $S_1$ to increase and $S_2$ to decrease, which causes the FBG fiber 300 to be expanded. In other words, due to the flexures 320 respective connection to the masses 330 in an off-center manner, the left mass 330 pivots in a counter-clockwise manner and the right mass 330 pivots in a clockwise manner in response to the upward force or acceleration. This produces an expansion-type strain upon the FBG segment 355 of the FBG fiber 350.

Similarly, a broadband incident light transmitted into the FBG fiber 350 causes the FBG segment 355 to reflect a portion of the broadband incident light with a wavelength being a function of the amount the FBG segment 355 has expanded, which, in turn, is a function of the upward force or acceleration applied to the FAC 300. Thus, by detecting the wavelength of the reflected light, a measurement of the upward force or acceleration may be ascertained.

The two scenarios described above can be extended for more general configurations of the general design and arrangement of parts by realizing that any relative placement of the flexures 320 on the masses 330, keeping the flexures 320 connected to the base 310 and the masses 330 connected to the FMCs 340, will allow for sensing of force/acceleration in any direction orthogonal to the ones described in FIGS. 4A-4B. The only conceptual requirement is that the flexures 320 be off-center in at least one of the three axes of the masses 330 in a mirrored orientation so that the Flexures 320 will bend to create strain in the FBG fiber 350 due to the Masses' inertial resistance.

Having developed the working principle and necessary concepts of the FAC, there are several novel concepts in the mechanical design and realization developed to ensure reliability.

Figure 5A:
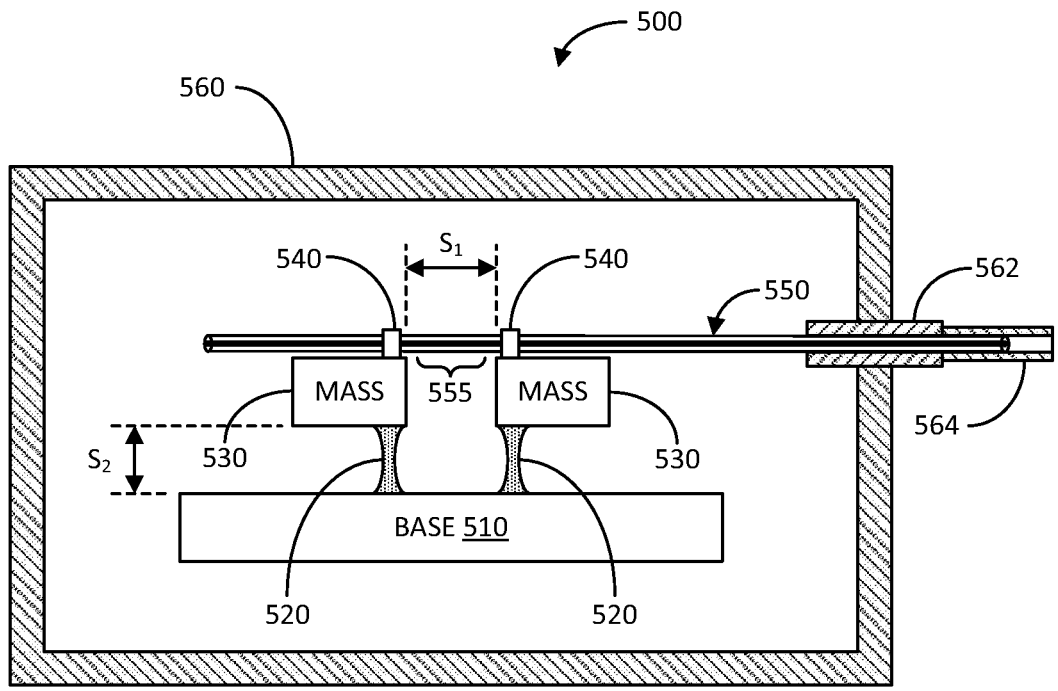
FIGS. 5A-5B illustrate side views of a set of exemplary fiber-based acceleration (FAC) detectors for sensing or measuring acceleration or force in accordance with another aspect of the disclosure.

FIG. 5A illustrates a side view of an exemplary fiber-based acceleration (FAC) detector 500 for sensing acceleration or force in accordance with another aspect of the disclosure. The FAC detector 500 may be configured similar to FAC detector 300 previously discussed. In particular, the FAC detector 500 includes a base 510, a pair of flexures 520 with lower ends attached to the base 510, a pair of masses 530 with bottom sides attached to respective upper ends of the flexures 520 in an off-center manner (e.g., favoring the middle of the FAC detector 500), a pair of FMCs 540 attached to the respective top sides of the masses 530, and a FBG fiber 550 including at least one FBG segment 555.

The FBG fiber 550 may be coated with gold (Au) for connection purposes. The gold is directly plated to the glass of the FBG fiber 550 to allow for soldering to both a housing 560 that surrounds the FAC to secure the FBG fiber 550, and for connecting the FBG fiber 550 to the FMCs 540 by soldering. As discussed in more detail below, the FBG fiber 550 may be pre-tensioned without compromising its structure since the gold is plated to the fiber itself (i.e., there is no need for fiber clamping, etc.). The soldering also allows for complete hermetic sealing at the points which the fiber exits the housing 560. The gold-portion of the FBG fiber 550 is soldered to the FMCs 540.

The FAC detector 500 further includes a feedthrough 562, which may be gold plated as well, so that it may be soldered onto the housing 560. The FBG fiber 550 is soldered onto the feedthrough 562 so that every connection is soldered or metal. The gold-portion of the FBG fiber 550 is soldered to the FMCs 540, and to the feedthrough 562, and the feedthrough 562 is soldered onto the metal housing 560. The portion of the FBG fiber 550, exterior to the housing 562 and feedthrough 562, may include an armor 564 coaxially surrounding the fiber for strength and rigidity.

Figure 5B:
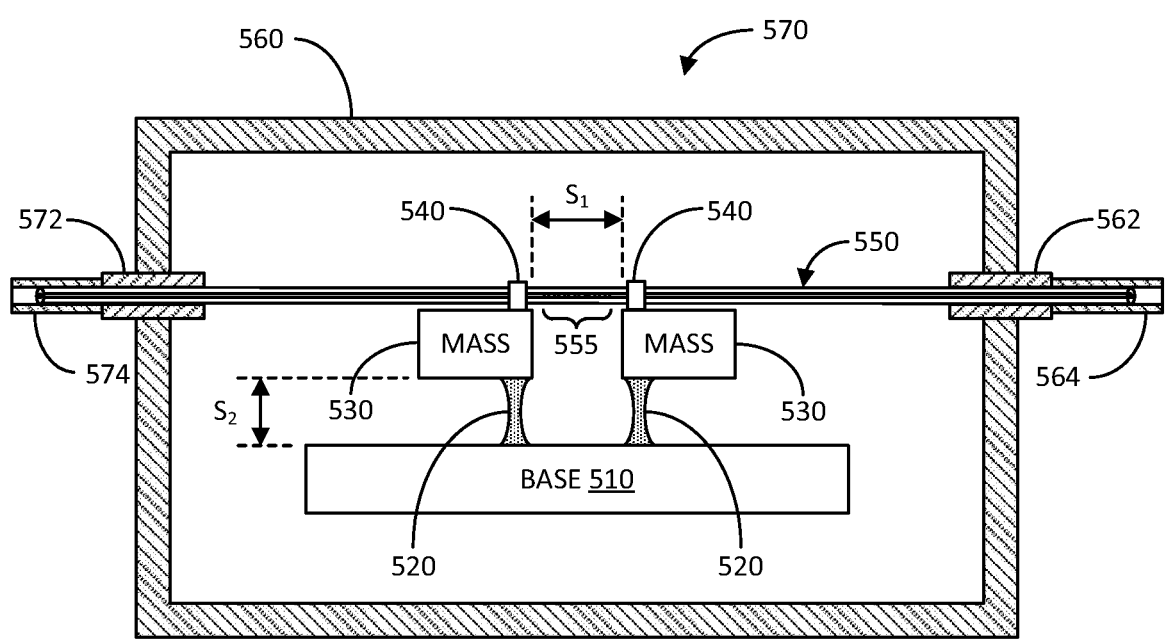

FIG. 5B illustrates a side view of another exemplary fiber-based acceleration (FAC) detector 570 for sensing acceleration or force in accordance with another aspect of the disclosure. The FAC detector 570 is a variation of FAC detector 550 previous discussed, including many of the same components as indicated by the same reference numbers. The FAC detector 570 differs in that both ends of the FBG fiber 550 are situated outside of the housing 560. Thus, in this regard, the FAC detector 570 includes the feedthrough 562 through which a first portion of the FBG fiber 550 extends from the interior to the exterior of the housing 560 as previously discussed with FAC detector 500. The FAC detector 570 includes another feedthrough 572, which may be gold plated for solder attachment to the housing 560, through which a second portion of the FBG fiber 550 extends from the interior to the exterior of the housing 560. The other end of the FBG fiber 550 may also include an armor 574 coaxially surrounding the fiber for strength and rigidity.

The force/acceleration measuring components of each of the FAC detectors 500 and 570 may be enclosed in the housing 560 in a hermetically sealed manner. For example, the exit/entrance points of the FBG fiber 550 may be hermetically sealed via the gold solder. The rest of the housing 560 may be hermetically sealed under usual methods and can be either vacuum-sealed or back-pumped with an inert gas, which can serve to stabilize temperature or performance.

The FBG fiber may be pre-tensioned so that the intrinsic state of the FBG fiber is tensioned allowing for two advantages: wavelength tuning and stability. By pre-tensioning, the intrinsic wavelength (the wavelength reflected by the FBG under no forces or vibrations) can be tuned to whatever wavelength desired. This allows for wavelength tuning beyond the actual wavelength derived from the FBG structure. Also, pre-tensioning may better protect the FBG fiber from crumpling, excessive bending or kinking during compression from force. The pre-tensioning keeps the fiber under tension during its entire operation. Examples of pre-tension-configured FAC detectors are discussed below.

Figure 6A:
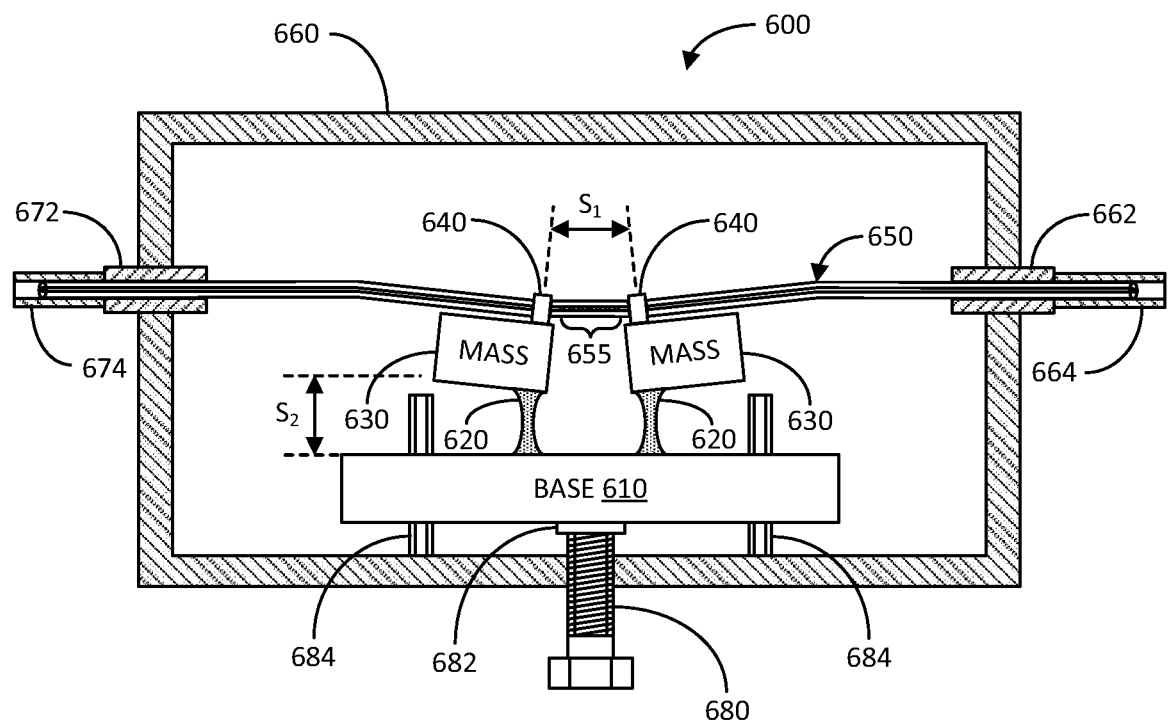
FIGS. 6A-6B illustrate side views of another set of exemplary fiber-based acceleration (FAC) detectors for sensing or measuring acceleration or force in accordance with another aspect of the disclosure.

FIG. 6A illustrates a side view of an exemplary fiber-based acceleration (FAC) detector 600 for sensing acceleration or force in accordance with another aspect of the disclosure. The FAC detector 600 may be configured similar to FAC detectors previously discussed. In particular, the FAC detector 600 includes a base 610, a pair of flexures 620 with lower ends attached to the base 610, a pair of masses 630 with bottom sides attached to respective upper ends of the flexures 620 in an off-center manner (e.g., favoring the middle of the FAC detector 600), a pair of FMCs 640 attached to the respective top sides of the masses 630, and an FBG fiber 650 including at least one FBG segment 655.

As in the previous embodiments, the FAC detector 600 includes a housing 660 for enclosing the aforementioned components, including a pair of a feedthroughs 662 and 672 through which the FBG fiber 650 extends into and out of the housing 660. Outside of the housing 660, the FBG fiber 650 includes a pair of armors 664 and 674 coaxially surrounding respective portions of the fiber FBG 650 for strength and rigidity. As in the previous embodiments, the FBG fiber 650 may be coated with gold for attachment to the feedthroughs 662 and 672 and the armors 664 and 674 by soldering. Similarly, the feedthroughs 662 and 672 may be coated with gold for attachment to the housing 660 by soldering.

For pre-tensioning purposes, the FAC detector 600 further includes a pre-tensioning adjustment screw 680 threaded into a threaded hole through the bottom side of the housing 660. The tail-end of the screw 680 is coupled to the bottom side of the base 610 via a bearing attachment 682 allowing the screw 680 to rotate while being attached to the base 610. Additionally, the FAC detector 600 includes vertically-oriented tracks 684 upon which the base 620 travels along in the vertical direction in response to turning of the pre-tensioning adjustment screw 680.

In the example shown in FIG. 6A, the FBG fiber 650 is pre-tensioned in such a way that the FBG segment 655 is in pre-compression. In this regard, the pre-tensioning adjustment screw 680 is positioned to lower the base 610 (and all components coupled to the base) below the position which results in the non-pretension-intrinsic state of the FBG fiber 650. In the pre-compression state, the resulting reflected wavelength during no force or acceleration is smaller than the reflected wavelength associated with the non-pretension-intrinsic state of the FBG fiber 650.

Figure 6B:
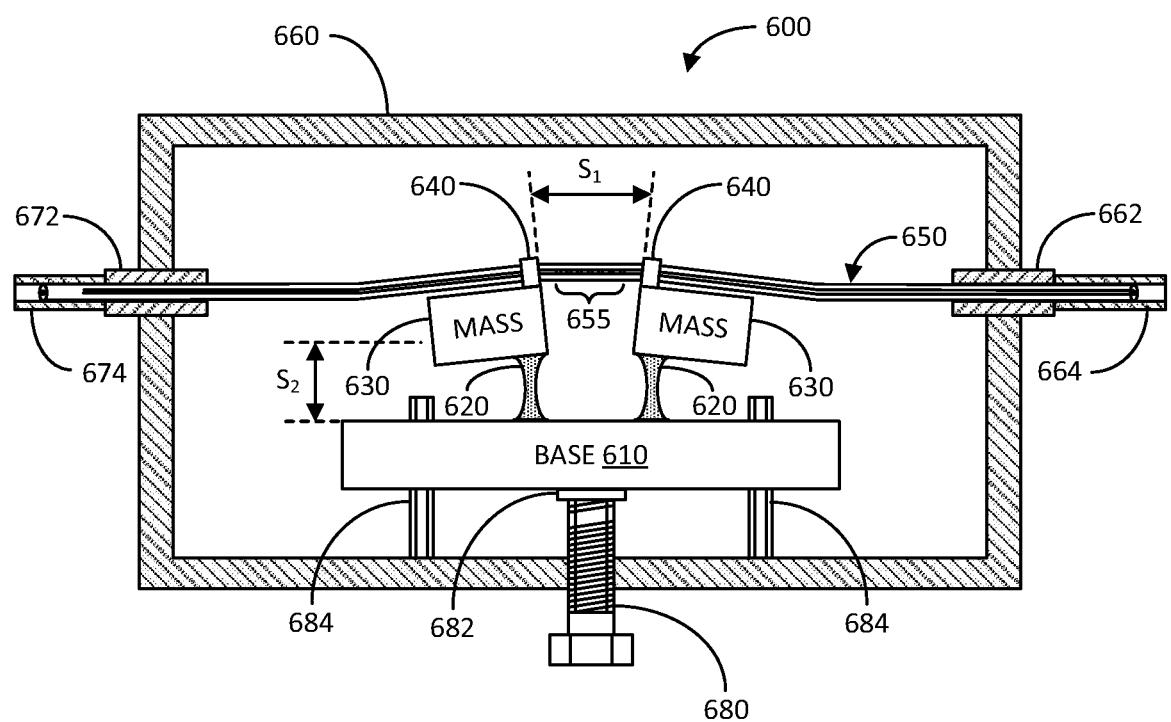

FIG. 6B illustrates a side view of FAC detector 600 pre-tensioned in such a way that the FBG segment 655 is in pre-expansion. In this regard, the pre-tensioning adjustment screw 680 is positioned to raise the base 610 (and all components coupled to the base) above the position which results in the non-pretension-intrinsic state of the FBG fiber 650. In the pre-expansion state, the resulting reflected wavelength during no force or acceleration is larger than the reflected wavelength associated with the non-pretension-intrinsic state of the FBG 650 fiber.

Figure 7A:
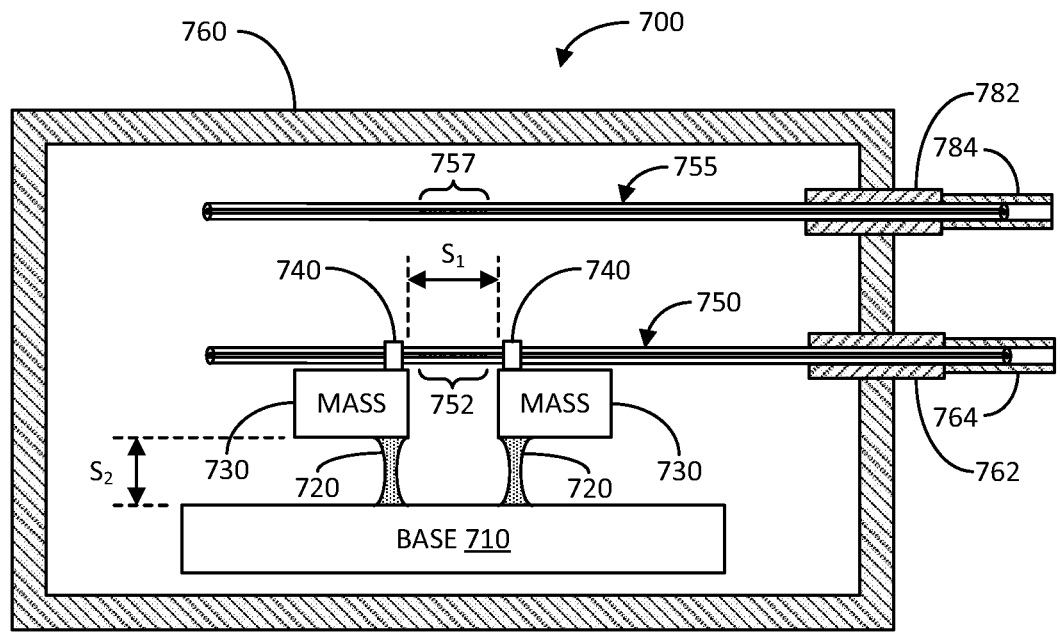
FIGS. 7A-7B illustrate side views of yet another set of exemplary fiber-based acceleration (FAC) detectors for sensing or measuring acceleration or force in accordance with another aspect of the disclosure.

FIG. 7A illustrates a side view of another exemplary fiber-based acceleration (FAC) detector 700 for sensing acceleration or force in accordance with another aspect of the disclosure. The FAC detector 700 may be configured similar to FAC detectors previously discussed. In particular, the FAC detector 700 includes a base 710, a pair of flexures 720 with lower ends attached to the base 710, a pair of masses 730 with bottom sides attached to respective upper ends of the flexures 720 in an off-center manner (e.g., favoring the middle of the FAC detector 700), a pair of FMCs 740 attached to the respective top sides of the masses 730, and an FBG fiber 750 including at least one FBG segment 752.

As in the previous embodiments, the FAC detector 700 includes a housing 760 for enclosing the aforementioned components, including a feedthrough 762 through which the FBG fiber 750 extends into and out of the housing 760. Outside of the housing 760, the FBG fiber 750 includes an armors 764 coaxially surrounding a portion of the FBG fiber 750 for strength and rigidity. As in the previous embodiments, the FBG fiber 750 may be coated with gold for attachment to the feedthrough 762 and the armor 764 by soldering. Similarly, the feedthrough 762 may be coated with gold also for attachment to the housing 760 by soldering.

A differential design of the FAC detector 700 that eliminates temperature induced drifting and stabilizes measurement may be implemented. In this regard, the FAC detector 700 further includes another FBG fiber 755 including an FBG segment 757. The FBG fiber 755 extends from outside to inside of the housing 760. The FAC detector 700 further includes another feedthrough 782 through which the FBG fiber 755 extends into the housing 760. Similarly, outside of the housing 760, the FBG fiber 755 includes an armor 784 coaxially surrounding a portion of the FBG fiber 755 for strength and rigidity. The FBG fiber 755 may be coated with gold for attachment to the feedthrough 782 and the armor 784 by soldering. Similarly, the feedthrough 782 may be coated with gold also for attachment to the housing 760 by soldering.

The differential sensing in FAC detector 700 may operate as follows. If the temperature of the environment in which the FAC detector 700 is situated rises or falls, the FBG segments 752 and 757 of the fiber FBGs 750 and 755 expand or contract by substantially the same amount. Since the FBG fibers 750 and 755 expand or contract by substantially the same amount with temperature change, the wavelengths of reflected optical signals off of the FBG segments 752 and 757 in response to incident optical signals changes in substantially the same manner with temperature change. Thus, by measuring the difference between the wavelengths of the reflected optical signal off of the FBG segments 752 and 757, any temperature variation can be substantially cancelled out. Thus, the FAC detector 700 is able to provide a more accurate measurement of acceleration or force in environments where the temperature is subject to wide changes.

Figure 7B:
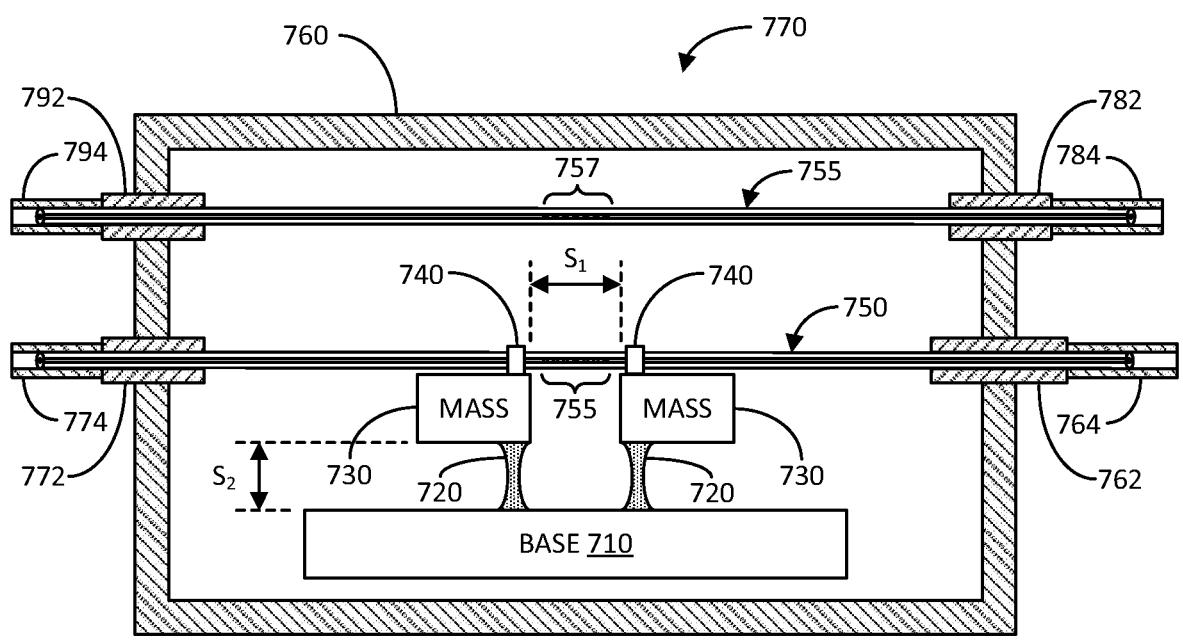

FIG. 7B illustrates a side view of another exemplary fiber-based acceleration (FAC) detector 770 for sensing acceleration or force in accordance with another aspect of the disclosure. The FAC detector 770 is similar to FAC detector 700 previously discussed including many of the same elements as indicated by the same reference numbers. The FAC detector 770 differs from FAC detector 700 in that the "measuring" and "reference" FBG fibers 750 and 755 extend into and out of the housing 760 from both sides.

Thus, the FAC detector 770 further includes another feedthrough 772 through which the FBG fiber 750 extends from inside to outside of the housing 760. The FAC detector 770 may further include an armor 774 coaxially surrounding the FBG fiber 750 at a portion outside of the housing 760 for strength and rigidity. Additionally, the FAC detector 770 includes another feedthrough 792 through which the FBG fiber 755 extends from inside to outside of the housing 760. The FAC detector 770 may further include an armor 794 coaxially surrounding the FBG fiber 755 at a portion outside of the housing 760 for strength and rigidity. The FBG fibers 700 and 755 may be coated with gold for attachment to the feedthroughs 772 and 792 and the armors 774 and 794 by soldering, respectively. Similarly, the feedthroughs 772 and 792 may be coated with gold also for attachment to the housing 760 by soldering.

Figure 8:
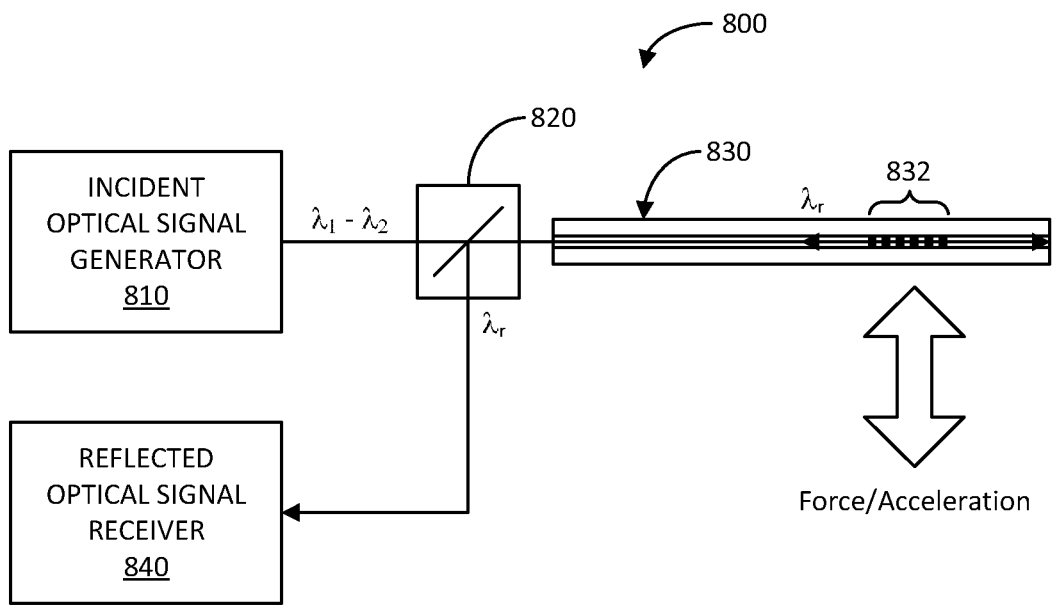
FIG. 8 illustrates a block diagram of an exemplary fiber-based acceleration (FAC) detector in accordance with another aspect of the disclosure.

FIG. 8 illustrates a block diagram of an exemplary fiber-based acceleration (FAC) detector 800 in accordance with another aspect of the disclosure. The FAC detector 800 includes an incident optical signal generator 810, an optical coupler 820, and an FBG fiber 830 including an FBG segment 832. Although not shown, the FBG fiber 830 is integrated with a base, flexures, masses, and FMCs, as previously described, and is subjected to compression and/or expansion due to an external force and/or acceleration. Additionally, the FAC detector 800 includes a reflected optical signal receiver 840.

The incident optical signal generator 810 generates a broadband optical signal with a wavelength range of $\lambda_1$ to $\lambda_2$. The entire wavelength range $\lambda_1$ to $\lambda_2$ may be generated at the same time as in a single broadband transmission, or may be swept in a time manner (e.g., in a triangular or sawtooth time manner). The optical coupler 820 allows the broadband optical signal $\lambda_1$-$\lambda_2$ to pass through from a first port to a second port without any significant loss, while directing a reflected optical signal $\lambda_r$ from the second port to a third port.

The FBG fiber 830 is coupled to the second port of the optical coupler 820. The FBG fiber 830 receives the broadband optical signal $\lambda_1$-$\lambda_2$ and generates the reflected optical signal $\lambda_r$ when the broadband optical signal $\lambda_1$-$\lambda_2$ encounters the FBG segment 832 of the FBG fiber 830. As discussed, the wavelength $\lambda_r$ of the reflected optical signal is a function of the force and/or acceleration acting upon the FBG segment 832. For example, if the force and/or acceleration causes the FBG segment 832 to be compressed, the wavelength $\lambda_r$ of the reflected signal will be smaller than the wavelength of the reflected signal when no force and/or acceleration acts upon the FBG segment 832. Similarly, if the force and/or acceleration causes the FBG segment 832 to expand, the wavelength $\lambda_r$ of the reflected signal will be larger than the wavelength of the reflected signal when no force and/or acceleration acts upon the FBG segment 832.

The reflected optical signal receiver 840 is coupled to the third port of the optical coupler 820. Accordingly, the receiver 840 receives and processes the reflected optical signal to determine its wavelength $\lambda_r$. Once the receiver 840 determines the wavelength $\lambda_r$, it can map the wavelength $\lambda_r$ to the force and/or acceleration being sensed or measured. As an example, in the case where the broadband optical signal $\lambda_1$-$\lambda_2$ is swept in a defined timed manner, the receiver 840 may determine the time at which the reflected optical signal is received to ascertain its wavelength $\lambda_r$ (e.g., the receiver 840 performs a time-to-wavelength conversion).

Figure 9:
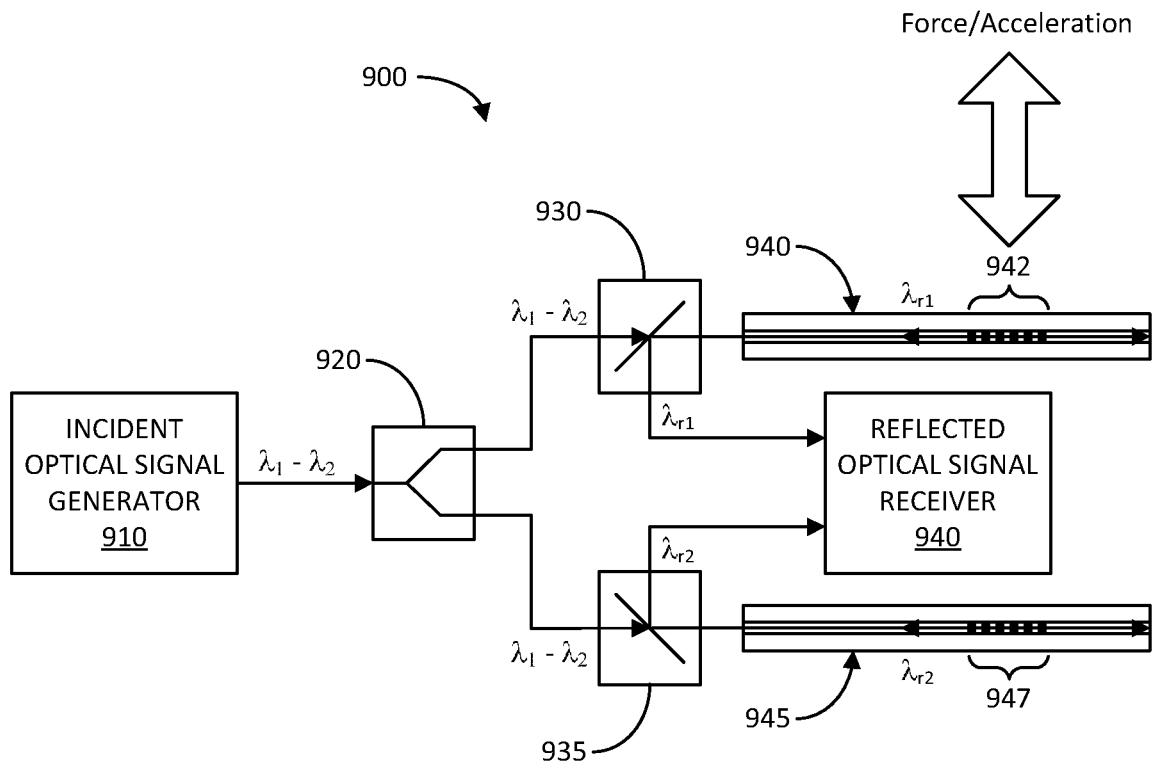
FIG. 9 illustrates a block diagram of yet another exemplary fiber-based acceleration (FAC) detector in accordance with another aspect of the disclosure.

FIG. 9 illustrates a block diagram of yet another exemplary fiber-based acceleration (FAC) detector 900 in accordance with another aspect of the disclosure. The FAC detector 900 is similar to the FAC 800, but further includes a reference FBG fiber and associated components, as discussed further herein. The reference FBG fiber is used to cancel out any variation in the wavelength of the reflected optical signal due to temperature changes. A change in temperature causes the FBG segment to expand or contract, which may be erroneously interpreted by a receiver as a sensed force and/or acceleration.

To eliminate or reduce the likelihood of such error, a receiver receives the reflected optical signals from the "measuring" FBG fiber and the reference FBG fiber. By performing a differential analysis on the reflected optical signals (e.g., measuring the difference between their wavelengths), the receiver is able to cancel out effects on the force and/or acceleration measurement due to temperature changes.

In particular, the FAC detector 900 includes an incident optical signal generator 910, an optical splitter 920, a first optical coupler 930, a "measuring" FBG fiber 940 including an FBG segment 942, a second optical coupler 935, and a "reference" FBG fiber 945 including an FBG segment 947, and a reflected optical signal receiver 940.

The incident optical signal generator 820 generates a broadband optical signal with a wavelength range of $\lambda_1$ to $\lambda_2$, as a single broadband transmission or in a swept time manner (e.g., in a triangular or sawtooth time manner). The optical splitter 920 splits the broadband optical signal $\lambda_1$-$\lambda_2$ to generate a first incident optical signal $\lambda_1$-$\lambda_2$ for the measuring FBG fiber 940 and a second incident optical signal $\lambda_1$-$\lambda_2$ for the reference FBG fiber 945.

The first optical coupler 930 allows the first incident optical signal $\lambda_1$-$\lambda_2$ to pass through from a first port to a second port without any significant loss, while directing a first reflected optical signal $\lambda_{r1}$ from the second port to a third port. The measuring FBG fiber 940 is coupled to the second port of the first optical coupler 930. Accordingly, the measuring FBG fiber 940 receives the first incident optical signal $\lambda_1$-$\lambda_2$ and generates the first reflected optical signal $\lambda_{r1}$ when the first incident optical signal $\lambda_1$-$\lambda_2$ encounters the FBG segment 942 of the measuring FBG fiber 940. As discussed, the wavelength $\lambda_{r1}$ of the first reflected optical signal is a function of the force and/or acceleration acting upon the FBG segment 942. The wavelength $\lambda_{r1}$ of the first reflected optical signal is also a function of the temperature of the FBG segment 942.

The second optical coupler 935 allows the second incident optical signal $\lambda_1$-$\lambda_2$ to pass through from a first port to a second port without any significant loss, while directing a second reflected optical signal $\lambda_{r2}$ from the second port to a third port. The reference FBG fiber 945 is coupled to the second port of the second optical coupler 935. Accordingly, the reference FBG fiber 945 receives the second incident optical signal $\lambda_1$-$\lambda_2$ and generates the second reflected optical signal $\lambda_{r2}$ when the second incident optical signal $\lambda_1$-$\lambda_2$ encounters the FBG segment 947 of the reference FBG fiber 945. Although no force and/or acceleration is acting upon the reference FBG fiber 945, the wavelength $\lambda_{r2}$ of the second reflected optical signal is a function of the temperature of the FBG segment 947.

The reflected optical signal receiver 940 is coupled to the third ports of the first and second optical couplers 930 and 935, respectively. Accordingly, the receiver 940 receives and processes the reflected optical signals and determines the difference $\lambda_{r1}$-$\lambda_{r2}$ in their respective wavelengths. Once the receiver 940 determines the wavelength difference $\lambda_{r1}$-$\lambda_{r2}$, it can map the difference $\lambda_{r1}$-$\lambda_{r2}$ to the force and/or acceleration being sensed or measured. If there is an environmental temperature change, and the FBG segments 942 and 947 are positioned close enough to each other such that the segments are affected substantially the same with the environmental temperature change, the wavelengths $\lambda_{r1}$ and $\lambda_{r2}$ of the reflected optical signals change substantially the same with environmental temperature change. Thus, there would be substantially no net effect on the wavelength difference $\lambda_{r1}$-$\lambda_{r2}$ due to temperature changes; thereby canceling out effects due to temperature.

With regard to any of the above FAC implementations, it shall be understood that that the connection of an FMC is connected to a mass is conceptual. In practice, this may be accomplished by forming (casting, molding, printing, etching, layering, etc.) the FMC/Mass so that both components are one piece, or by forming the FMC and Mass separately and joining them together (welding, melting, mechanically connecting, gluing, etc.), or machining parts from one original piece.

With regard to any of the above FAC implementations, it shall be understood that that the connection of a mass is connected to a flexure is conceptual. In practice, this may be accomplished by forming (casting, molding, printing, etching, layering, etc.) the FMC/Mass so that both components are one piece, or by forming the Mass and Flexure separately and joining them together (welding, melting, mechanically connecting, gluing, etc.), or machining parts from one original piece.

With regard to any of the above FAC implementations, it shall be understood that that the connection of a Flexure is connected to the Base is conceptual. In practice, this may be accomplished by forming (casting, molding, printing, etching, layering, etc.) the FMC/Mass so that both components are one piece, or by forming the Mass and Flexure separately and joining them together (welding, melting, mechanically connecting, gluing, etc.), or machining parts from one original piece.

Finally, any combination of the above pieces that are connected by another piece (i.e. the FMC/Mass/Flexure combination, the Mass/Flexure/Base combination and the FMC/Mass/Flexure/Base combination) can be formed (casting, molding, printing, etching, layering, etc.) so that the components are one piece, or by forming the components separately and joining them together (welding, melting, mechanically connecting, gluing, etc.), or machining parts from one original piece.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus, comprising:
   a base;
   first and second flexures mechanically coupled to the base;
   first and second masses mechanically coupled to the first and second flexures, respectively;
   a first fiber Bragg grating (FBG) fiber mechanically coupled to the first and second masses, wherein the first and second flexures and the first and second masses are configured to move in response to a force and/or acceleration acting upon the first and second masses to produce a compression or expansion of the first FBG fiber; and
   a pre-tensioning device including an adjustment screw configured to selectively pre-compress or pre-expand the first FBG fiber without the force and/or acceleration acting upon the first FBG fiber.

2. The apparatus of claim 1, further comprising first and second couplers mechanically coupling the first FBG fiber to the first and second masses, respectively.

3. The apparatus of claim 2, wherein the first FBG fiber includes an FBG segment is situated between the first and second couplers.

4. The apparatus of claim 3, wherein the first FBG fiber includes an outer metallic coating soldered onto the first and second couplers.

5. The apparatus of claim 1, wherein the first and second masses are mechanically coupled to the first and second flexures in an off-center manner allowing the first and second masses to pivot in opposite directions due to the force and/or acceleration acting upon the first and second masses.

6. The apparatus of claim 1, further comprising a housing enclosing the base, the first and second flexures, the first and second masses, and at least a portion of the first FBG fiber.

7. The apparatus of claim 6, further comprising a first feedthrough mechanically coupled to the housing, wherein the first FBG fiber extends from an interior to an exterior of the housing via the first feedthrough.

8. The apparatus of claim 7, wherein the first FBG fiber includes an outer metallic coating soldered onto the first feedthrough.

9. The apparatus of claim 7, wherein the first feedthrough includes an outer metallic coating soldered onto the housing.

10. The apparatus of claim 7, further comprising a second feedthrough mechanically coupled to the housing, wherein the first FBG fiber also extends from the interior to the exterior of the housing via the second feedthrough.

11. The apparatus of claim 6, further comprising an armor coaxially surrounding and coupled to the first FBG fiber at a region exterior to the housing.

12. The apparatus of claim 11, wherein the first FBG fiber includes an outer metallic coating soldered onto the armor.

13. The apparatus of claim 6, wherein the base is rigidly coupled to the housing.

14. The apparatus of claim 1, wherein the adjustment screw is threaded into a threaded hole of a housing, wherein the adjustment screw includes an end coupled to the base via a bearing attachment; and wherein the pre-tensioning device further comprises:
   a set of tracks along which the base travels in response to turning of the adjustment screw, wherein the turning of the adjustment screw in a clockwise or counter-clockwise direction produces the pre-compression or the pre-expansion of the first FBG fiber.

15. The apparatus of claim 1, further comprising:
   an incident optical signal generator configured to generate an incident optical signal;
   an optical coupler configured to:
      direct the incident optical signal to the first FBG fiber; and
      receive a reflected optical signal from the first FBG fiber; and
   a reflected optical signal receiver configured to:
      receive the reflected optical signal from the optical coupler; and
      process the reflected optical signal to sense or determine the force and/or acceleration acting upon the first FBG fiber.

16. The apparatus of claim 1, further comprising a second FBG fiber, wherein the force and/or acceleration acting upon the first FBG fiber does not substantially affect the second FBG fiber.

17. The apparatus of claim 16, further comprising:
   an incident optical signal generator configured to generate an optical signal;
   an optical splitter configured to split the optical signal to generate first and second incident optical signals;
   a first optical coupler configured to:
      direct the first incident optical signal to the first FBG fiber; and
      receive a first reflected optical signal from the first FBG fiber;

a second optical coupler configured to:
  direct the second incident optical signal to the second FBG fiber; and
  receive a second reflected optical signal from the second FBG fiber; and
a reflected optical signal receiver configured to:
  receive the first and second reflected optical signals from the first and second optical couplers, respectively; and
  process the first and second reflected optical signals to sense or determine the force and/or acceleration acting upon the first FBG fiber.

18. The apparatus of claim 16, further comprising a housing enclosing the base, the first and second flexures, the first and second masses, and at least portions of the first and second FBG fibers, respectively.

19. The apparatus of claim 18, further comprising:
a first set of feedthroughs coupled to the housing, wherein the first FBG fiber extends between an interior and exterior of the housing via the first set of feedthroughs; and
a second set of feedthroughs coupled to the housing, wherein the second FBG extends between the interior and exterior of the housing via the second set of feedthroughs.

* * * * *